June 14, 1966    J. T. ARNOLD    3,256,500
OPTICAL MAGNETOMETERS
Filed Jan. 7, 1963    2 Sheets-Sheet 1
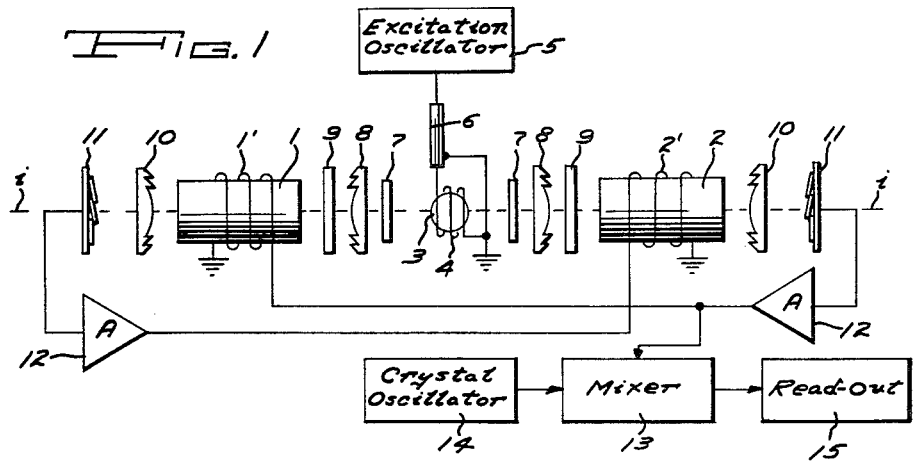
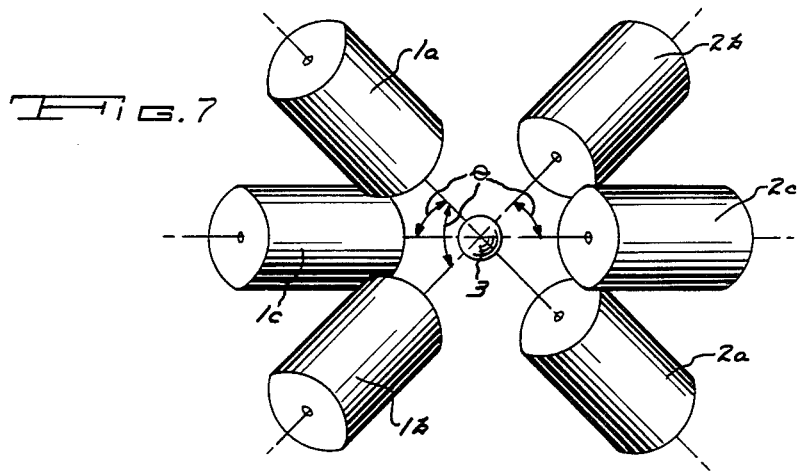
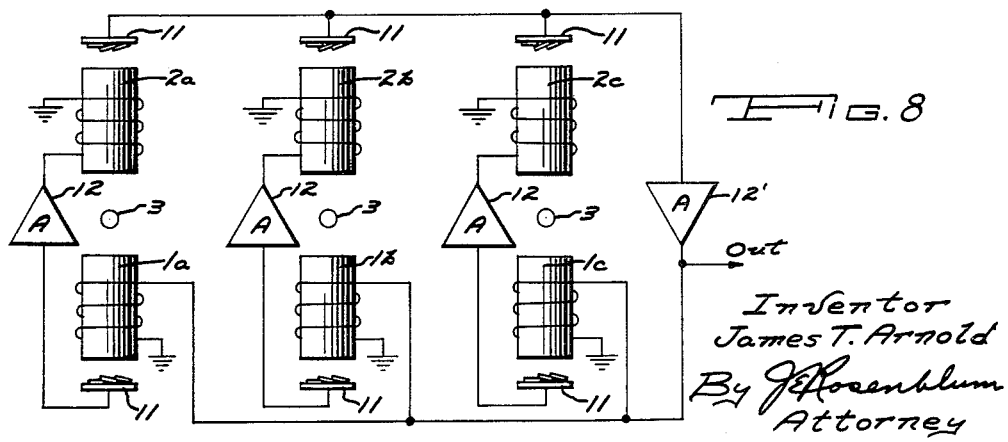
Inventor
James T. Arnold
By J. E. Rosenblum
Attorney

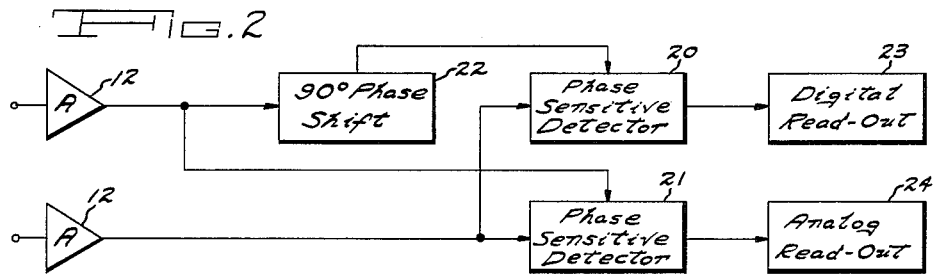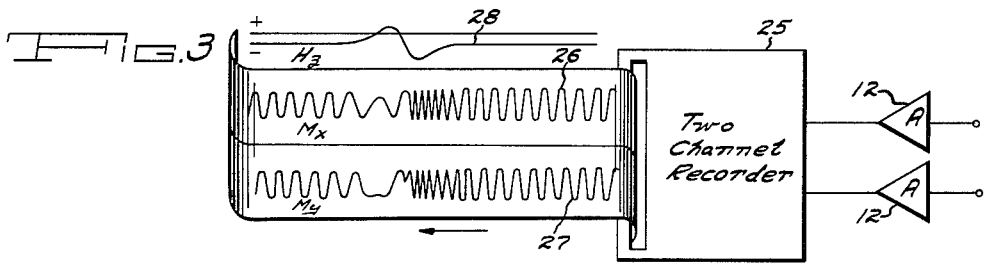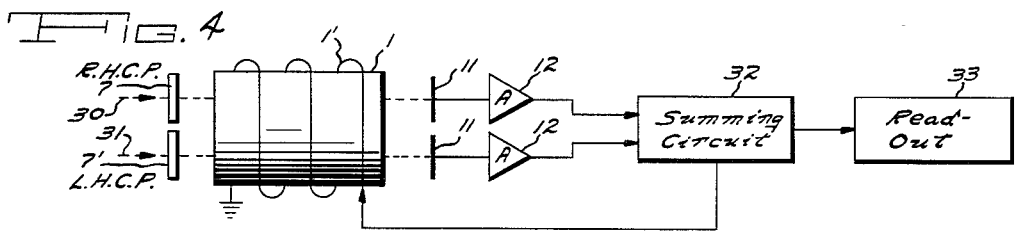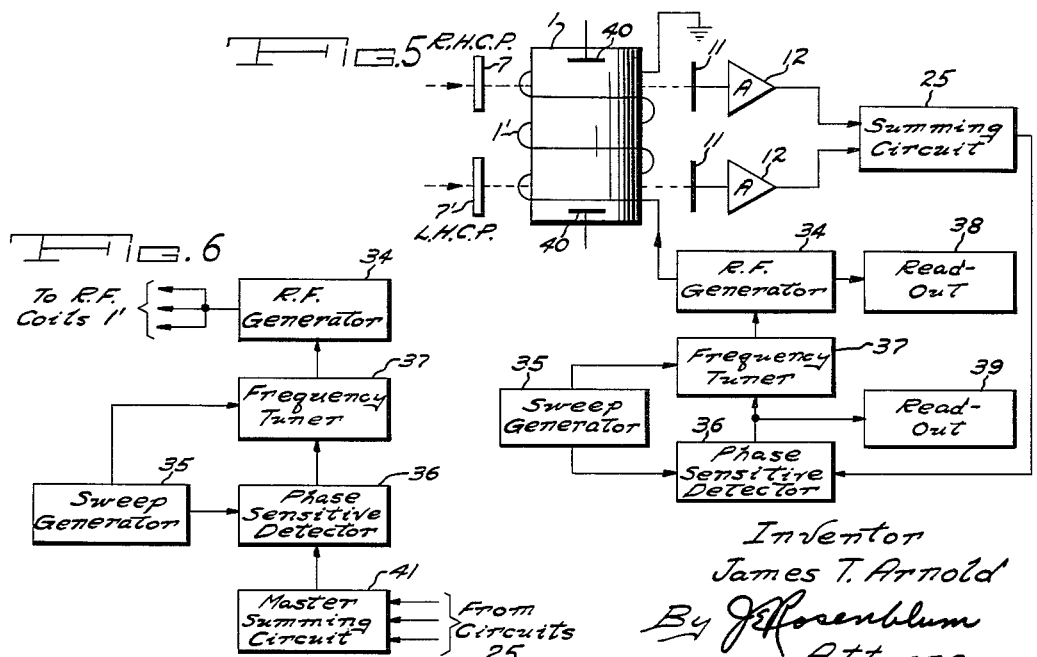

United States Patent Office 3,256,500
Patented June 14, 1966

3,256,500
OPTICAL MAGNETOMETERS
James T. Arnold, Los Altos Hills, Calif., assignor to Varian Associates, Palo Alto, Calif., a corporation of California
Filed Jan. 7, 1963, Ser. No. 250,460
29 Claims. (Cl. 324—.5)

This application is a continuation-in-part of U.S. patent application Ser. No. 62,480, filed Oct. 13, 1960, and now abandoned.

The present invention relates in general to the measurement of weak magnetic fields, and more particularly to orientation-independent optical magnetometers for use in airborne geophysical prospecting and the like.

The magnetometers of the present invention are based on principles disclosed by Hans G. Dehmelt in the following U.S. patent applications: Ser. No. 640,020, filed Feb. 13, 1957, now U.S. Patent 3,071,721, Ser. No. 649,190, filed Mar. 28, 1957, and now abandoned in favor of Ser. No. 313,186, filed Oct. 2, 1963, and now abandoned; Ser. No. 649,191, filed Mar. 28, 1957, and now abandoned in favor of Ser. No. 350,887, filed Mar. 9, 1964, which is now abandoned in favor of Ser. No. 407,422, filed Oct. 29, 1964 and now abandoned, Ser. No. 653,180, filed Apr. 16, 1957, now U.S. Patent 3,150,313 and also French Patent 1,229,644, published Sept. 8, 1960 which is based on these U.S. applications. Briefly, such magnetometers comprise an optical absorption cell containing an assemblage of atoms or other quantum systems characterized by a long-lived ground or metastable energy state which is split into a plurality of magnetic sublevels by an external unidirectional magnetic field—for example, the earth's magnetic field—the amount of the splitting being determined by the intensity of the field. The quantum systems are aligned or oriented so that a first set of one or more sublevels is over-populated with respect to a second set of one or more sublevels, and a monitoring optical radiation beam is passed through the absorption cell with such spectral characteristic (intensity v. frequency distribution, polarization, and direction) that it is more strongly absorbed by the quantum systems in one set of sublevels than by those in the other set. If, now, an alternating magnetic field is applied to the absorption cell at the proper frequency for inducing magnetic resonance precessions of the magnetic moments of the quantum systems, the alignment and hence absorption characteristics of the cell is changed thereby producing a detectable signal in the intensity of the optical radiation which has passed through the absorption cell without absorption.

In one example, the absorption cell contains a vapor of alkali atoms irradiated by a circularly polarized beam of alkali optical resonance radiation. The beam serves the dual function of aligning the atoms by optical pumping (a process whereby the absorbing atoms which are raised to an excited state rapidly decay back to over-populate the less absorbing sublevels), and of monitoring the variation in alignment. It another example, atoms of helium gas are maintained in a metastable state by an R.F. discharge and are irradiated by helium optical resonance radiation which also serves a dual aligning and monitoring function, and which also may be circularly polarized. In a still further example, atoms of mercury vapor are aligned in a metastable state by spin exchange with a bombarding electron beam, and the alignment is monitored by plane polarized mercury optical resonance radiation.

Two particular types of optical magnetometers utilizing the above principles are: the swept system as illustrated, for example, by FIG. 6 of U.S. Patent 3,071,721 (FIG. 6 of French Patent 1,229,644), and FIG. 5 of U.S. patent application Ser. No. 649,191 (FIG. 11 of French Patent 1,229,644); and the self-oscillation system as illustrated, for example, by FIG. 8 of U.S. Patent 3,150,313 (FIG. 19 of French Patent 1,229,644), U.S. patent application Ser. No. 56,484 of Kenneth A. Ruddock et al., filed Sept. 16, 1960, and FIG. 5 of an article beginning page 47 of the August 5, 1960 issue of Electronics. In the swept system, an external radio frequency generator supplies the alternating magnetic field to the absorption cell and the generator frequency (or alternatively the intensity of a second magnetic field superimposed on the unknown magnetic field) is slowly swept or modulated to detect the change in the net intensity of transmitted optical radiation which results at the magnetic resonance condition. The generator may be automatically frequency controlled to the precession frequency which is required for this condition of resonance; and since this precession frequency is a substantially linear function of the external unidirectional field, the controlled frequency provides a continuous indication of magnetic field intensity. In the self-oscillation system, use is made of the well-defined periodic intensity modulation of the transmitted radiation resulting from the time-varying alignment due to magnetic resonance precessions of the magnetic moments of the quantum systems. This modulation is amplified and fed back to the absorption cell in the form of a resonance frequency alternating magnetic field with the proper phase and orientation for sustaining the optical intensity modulation by forced precessions of the quantum systems. Thus self-sustained oscillation is established at a frequency determined by the precession frequency so that the oscillation frequency provides a continuous indication of magnetic field intensity. The self-oscillating magnetometer is advantageously characterized by its ability to respond to rapid and large excursions in magnetic field value.

Such optical magnetometers have demonstrated reliable operation with sensitivities on the order of .01 gamma (1 gamma=$10^{-5}$ gauss), this being 10 to 100 times as sensitive as flux gate and proton precession magnetometers now used for airborne geophysical surveys. Heretofore, however, their usefulness for airborne and other mobile applications has been seriously limited in view of the following sources of orientation dependence:

(1) The resonance line representing optical absorption as a function of the frequency of the alternating magnetic field applied to the absorption cell is actually split into several closely-spaced lines, due to slight differences in the frequency separation of the various magnetic sublevels. Since the contributions of the several lines are not in general equal, the total absorption line in an asymmetrical one the shape of which depends on the direction of the light beam relative to the unidirectional field. Thus, as the instrument is rotated, a heading error is introduced due, for example, to variations in the frequency at which automatic control is established in the case of a swept system or at which the condition for oscillation is met in the case of a self-oscillation system.

(2) In the case of the self-oscillation magnetometer the phase shift between the feedback signal applied to the absorption cell and the intensity modulation of the light beam is a function of the relative orientation between the direction of the resonance frequency magnetic field vector, the direction of the unidirectional magnetic field, and the direction of the light beam. In the most symmetrical case in which the resonance frequency magnetic field vector is constrained to the collinear with the light beam, a phase shift of +90° is encountered with the light beam directed in one hemisphere (with reference to the direction of the unidirectional field), and a phase shift of −90° is encountered with the light beam directed in the other hemisphere. Thus, when the total phase shift about the oscillator loop is proper for oscillation in one hemisphere, a so-called "hemisphere effect" exists whereby the phase shift will not be proper for oscillation when the instrument is oriented in the other hemisphere, unless the phase of the feedback signal is simultaneously reversed. One means of overcoming this hemisphere effect, disclosed in the above-cited U.S. patent application of Kenneth A. Ruddock et al., is to provide an automatic electronic switch which reverses the output connections of the feedback amplifier whenever the oscillation tends to die out. This solution, while quite useful, introduces considerable circuit complexities, especially at very low fields where a considerable time is required for determining whether the system is oscillating.

(3) The signal amplitude experiences dead zones when the light beam is at certain angles with respect to the unidirectional field direction. For example, where a single circularly polarized light beam is used to perform the dual function of aligning the quantum systems by optical pumping and monitoring the alignment by changes in the absorption of the beam, a dead zone is experienced in and near the equatorial plane (with reference to the field direction) as a consequence of the fact that the beam must have a propagation direction component in the direction of the field in order to pump. In the case of the self-oscillating magnetometer, polar dead zones are also encountered as a consequence of the fact that the beam must have a propagation component at right angles to the field in order to monitor the periodic variation in alignment.

It is the principal object of the present invention to provide improved optical magnetometers in which the effect of one or more of the above-described sources of orientation dependence is reduced.

One feature of the present invention is the provision of a self-oscillation optical magnetometer having cross-coupled absorption cells.

Another feature of the present invention is the provision of an optical magnetometer utilizing light beams having different senses of circular polarization relative to the direction of the unidirectional magnetic field being measured.

Still another feature of the present invention is the provision of an optical magnetometer arrangement comprising a plurality of separate magnetometers oriented such that their dead zones are in anti-coincidence.

These and other features and advantages of the present invention will become apparent upon a perusal of the following specification taken in connection with the accompanying drawings wherein the same numeral is used in the various figures to designate the same or similar element and:

FIG. 1 is a schematic circuit diagram of a self-oscillation magnetometer in accordance with the present invention utilizing cross-coupled absorption cells, FIG. 2 is a schematic circuit diagram of a phase shift monitoring system for use with the magnetometer of FIG. 1, FIG. 3 is a schematic circuit diagram of a two-phase recording system for use with the magnetometer of FIG. 1, FIG. 4 is a schematic circuit diagram of a single cell self-oscillation magnetometer in accordance with the present invention, FIG. 5 is a schematic circuit diagram of a swept magnetometer in accordance with the present invention, FIG. 6 is a schematic circuit diagram of a multiple swept magnetometer in accordance with the present invention, FIG. 7 is an isometric view illustrating the absorption cell arrangement of a multiple self-oscillation magnetometer in accordance with the present invention, and FIG. 8 is a schematic circuit diagram of a magnetometer utilizing the cell configuration of FIG. 2.

Referring, now, to the self-oscillation embodiment of FIG. 1, an alkali vapor is the preferred optical absorption medium, it being advantageously characterized by optical resonance and magnetic precession frequencies at which the light intensity modulation may be quite simply and effectively converted to an alternating electrical signal. Of the various alkali metals, rubidium vapor has a further advantage in that its optimum cell temperature (about 40° C.) is well suited for field operating conditions.

The light source which produces oppositely-directed beams through absorption cells 1 and 2 is a high spectral purity, low noise, electrodeless discharge lamp of the type described in U.S. patent application Serial No. 56,412, filed Sept. 16, 1960, now Patent No. 3,109,960, granted Nov. 5, 1963, comprising a small discharge blub 3 of natural rubidium vapor mixed with a starting medium of krypton gas closely-coupled to an external R.F. discharge coil 4 which is energized by excitation oscillator 5. The coil 4 is preferably coupled to the oscillator 5 through a long coaxial transmission line 6 in order to minimize magnetic distortions which may be caused by the components of the oscillator circuit. Each light beam successively passes through an interference filter 7 which suppresses the 7800 angstrom "$D_2$" line while passing the 7948 angstrom "$D_1$" line thereby enhancing optical pumping, a plastic sheet fresnel collimating lens 8, a circular polarizer 9 for effecting differential sublevel absorption, an associated absorption cell 1 or 2, a second collimating lens 10, and is focused on a photocell 11 which comprises a mosaic of silicon solar cells soldered together like shingles in series fashion as more fully described in the above-cited patent application of Kenneth A. Ruddock et al.

The absorption cells 1 and 2 contain a rubidium vapor which is preferably isotopically enriched with respect to either rubidium-85 or rubidium-87, mixed with a buffer gas such as neon to reduce disorienting wall collisions thereby providing long relaxation times and consequently the narrow line widths required for high sensitivity. In the case of rubidium-85 the polarized and filtered light beam will be modulated at a precession frequency of approximately 4.66 cycles per gamma, and in the case of rubidium-87 at a precession frequency of approximately 7.00 cycles per gamma (1 gamma=$10^{-5}$ gauss). For example, in an average earth's field of 0.5 gauss, the precession frequency of rubidium-85 is about 233 kc. This intensity modulation is converted by the photocells 11 to alternating electrical signals of the same frequency which are respectively amplified by each amplifier 12 and fed back in cross-coupled relation to the absorption cells through oppositely wound coaxial coils 1' and 2' in the form of an alternating magnetic field which maintains forced precessions of the rubidium atoms thereby effecting self-sustained oscillation at a frequency proportional to the intensity of the unidirectional magnetic field being measured. A signal from amplifier 12 at this frequency is combined in mixer 13 with a signal from crystal-controlled oscillator 14 at a frequency corresponding to a reference field intensity to produce a difference frequency which is indicated by a read-out device 15 such as an analog output frequency meter coupled to a graphic recorder. Other methods for measuring the optical oscillation frequency as an indication of the unknown magnetic field intensity will be apparent to those skilled in the art.

In order to maintain a condition of self-sustained oscillation, the total phase shift through the gas cells 1 and 2, photocells 11 and amplifiers 12 must be zero. Since the light beam and alternating field vector are coaxial about the instrument axis $i$ and the coils 1' and 2' are connected in opposite senses, a phase shift of 90° is encountered at each absorption cell whereby the net absorption cell phase shift is 180°. For fields greater than about 10,000 gammas, the shunt capacitance of the equivalent photocell circuit will be sufficient to yield a 90° phase shift at each photocell so that the net photocell contribution is 180°. Finally, the amplifiers may be readily designed to exhibit a zero phase shift which permits oscillation over a wide dynamic range.

When the instrument is rotated from one magnetic hemisphere to the other, the phase shift through each of the absorption cells 1 and 2 is reversed, for example from +90° to −90°. However, the net absorption cell phase shift remains at 180°, thereby maintaining the condition of oscillation and eliminating the previously discussed hemisphere effect. At low fields when the phase shift of each photocell departs from 90°, phase shift compensating networks may be included so that the compensated net contribution of the photocells will be either zero or 180°. In the case where the net photocell phase shift is zero degrees, the sense of coil connection on one of the absorption cells is reversed so that the phase shift through one cell is +90° and the phase shift through the other cell is −90° thereby giving a net absorption cell phase shift which is also zero. Further, it is possible to replace the single lamp 3 by two separate lamps which provide parallel light beams (propagated in either the same direction or in opposite directions). In all of these cases, the hemisphere effect is eliminated since the net phase shift through the two absorption cells is the same, regardless of the direction of the instrument relative to the unidirectional magnetic field.

It is of interest to note that if a small gradient in unidirectional field intensity exists between the location of cells 1 and 2, the system will oscillate at a frequency intermediate the exact resonance frequency of each cell with a coresponding deviation from 90 degrees in the absolute value of the phase shift through each cell. Recalling that the sign of the phase shift depends upon the magnetic hemisphere orientation of the instrument, it is apparent that these phase shifts may be monitored to provide information as to the relative orientation between the field and the instrument, and also as to the magnitude and direction of the field gradient. A suitable arrangement for performing these functions is shown in FIG. 2. The signal from each photocell amplifier 12 is applied to one input of separate phase sensitive detectors 20 and 21. The input from one of the amplifiers 12 to one of the detectors 20 is phase shifted 90° by a network 22 in order to shift the null output of this detector from the condition of 90° phase difference between amplifier signals (as is the case for detector 21) to the condition of zero (or 180°) phase difference. Thus the output of detector 20 is a D.C. signal whose polarity depends upon the hemisphere orientation of the instrument, and this is fed to a simple digital read-out 23 which indicates which hemisphere this is. The output of detector 21 is a D.C. voltage whose magnitude depends on the magntiude of the gradient between the cells and whose polarity depends on the direction of the gradient, this output being recorded by an analog read-out 24 such as a graphic recorder.

Another interesting feature is that the light modulation due to one absorption cell is substantially in phase quadrature with that due to the other cell when these cells are the only sources of phase shift (the net phase shift of each photocell-amplifier combination 11, 12 being adjusted to zero). Thus, my monitoring the two light modulations simultaneously, two-phase information is available which would be useful, for example, in the event of a rapid change in field direction and amplitude. A suitable arrangement for utilizing this feature is shown in FIG. 3 wherein the signal from each photocell amplifier 12 is fed to a separate input of a two-channel graphic recorder 25 to provide separate traces 26 and 27 for each signal.

As an example of the utility of the system of FIG. 3, consider (in an $x$-$y$-$z$ coordinate system) a transient in the unidirectional field Hz. as shown by curve 28, this transient making the field first slightly negative and then highly positive in a short time interval. Responding to this transient, the signal trace 26 from one photocell amplifier 12 is proportional to M$x$ and the signal trace 27 from the other amplifier is proportional to M$y$, where $\bar{M}$ is the precessing magnetization vector in a single one of the absorption cells 1 or 2. For field changes which occur in a time long compared to a precession cycle, it is usually sufficient to monitor only a single component, M$x$ or M$y$; but when such changes occur more rapidly, as in the illustrated example, single component monitoring gives incomplete information for determining the exact frequency and phase variations, particularly when the field reverses direction. By recording both M$x$ and M$y$, the instantaneous phase $\theta = \tan^{-1}(My/Mx)$ and precession frequency $d\theta/dt$ are continuously determined.

Referring again to FIG. 1, the oppositely-directed light beams are either both righthand circularly polarized or both lefthand circularly polarized whereby the light beams have opposite senses of circular polarization with respect to the unidirectional magnetic field direction and hence inverse distributions of sublevel adsorption. As a result, the optical absorption resonance line associated with one cell is the mirror image of the absorption line associated with the other cell, so that even if the separate lines are asymmetrical, the composite absorption line will be substantially symmetrical thereby reducing the previously discussed heading error due to shifts in the oscillation frequency as the instrument is rotated. In cases where two light beams are propagated in the same direction, opposite senses of circular polarization for reducing the heading error are obtained by righthand circular polarizing one beam and lefthand circular polarizing the other beam.

The use of two light beams (from the same or separate lamps) which have opposite senses of circular polarization relative to the unidirectional magnetic field will also reduce the heading error when a single absorption cell having a separate section for each light beam is used, for example, in the magnetometer of either the self-oscillation type or the swept type. Examples are shown in FIGS. 4 and 5.

In addition to reducing heading error, the increased line symmetry also advantageously improves the linearity of the relationship between the magnetic precession frequency and the unidirectional field intensity by removing terms of second order.

In the self-oscillating system of FIG. 4, one light beam portion 30 is righthand circularly polarized by polarizer 7, passes through the upper portion of absorption cell 1, and is intercepted by a first photocell 11 energizing a first amplifier 12. A second light beam portion 31 is lefthand circularly polarized by polarizer 7', passes through the lower portion of absorption cell 1, and is intercepted by a second photocell 11 energizing a second amplifier 12. The two portions of the adsorption cell may be sealed off from each other, or alternately the buffer gas, for example, may be relied upon to keep atoms substantially separated in the two cell portions. The precession frequency signals from the two amplifiers 12 are summed in a circuit 12 and then fed back through coil 1' to maintain self-oscillation at the precession frequency which is monitored by read-out 33 to provide a continuous indication of field intensity.

In the swept system of FIG. 5, the well known technique of inducing magnetic resonance with an external R.F. generator 34 is used. The condition of resonance is modulated at a low frequency as by frequency modulating the generator 34 by sweep generator 35. Variations in the light intensity intercepted by the two photocells 11 at the sweep frequency are amplified by amplifiers 12, summed in circuit 32, and applied to the phase detector 36 which receives a reference signal from sweep generator 35. The output of phase detector 36 is an error signal which is fed to tuner 37 for maintaining the frequency of the R.F. generator 34 at the resonance value in the unidirectional field. The intensity of said field is then indicated by the frequency of generator 34 as monitored by read-out 38, or by the magnitude of the error signal as monitored by read-out 39. Discharge electrodes 40 may be added to the absorption cell where, as in the case of helium, a discharge to provide metastable atoms is desired.

The swept system of FIG. 5 will experience signal dead zone whenever the light beam is substantially perpendicular to the unidirectional magnetic field. To remove these completely, when desired, three separate magnetometer sensing units with mutually orthogonal light beams are required, the signal dead zones of the separate units being anti-coincident. It is a fairly simple matter to insure continuous operation without phase ambiguity by driving the coil 1' of each sensing unit from the same R.F. generator 34, this generator being controlled via a master summing circuit 41 which sums the input from each of the separate unit summing circuits 32, as shown in FIG. 6. If only two orthogonal sensing units are used, all dead zones are eliminated except for positions in which the plane of the two light beam directions is perpendicular to the field direction.

The self-oscillator magnetometers of FIGS. 1 and 4 will experience signal dead zones when the instrument axis is within approximately ±5° of being parallel or perpendicular to the unidirectional magnetic field. When it is desired to provide an instrument which may be operated without this restriction on heading, a multiple self-oscillating magnetometer using the absorption cell configuration of FIG. 2 may be used, this being illustrated for the case of three cross-coupled single units as shown in FIG. 7. The optical axes of the three absorption cell pairs 1a and 2a, 1b and 2b, 1c and 2c, are disposed at an acute angle $\theta$ (for example, 45°) with respect to each other, so that when one pair of cells enters a dead zone at least one of the other two pairs is substantially removed from any dead zone. A simpler instrument using only two of the three pairs of absorption cells would eliminate all but a small dead zone perpendicular to the plane defined by the two magnetometer optical axes.

A schematic circuit diagram of a multiple oscillator magnetometer using the cell configuration of FIG. 2, is shown in FIG. 8. The output associated with the second absorption cell 2a, 2b or 2c of each oscillator is fed via its respective upper photocell 11 to an output amplifier 12' which is common to all three oscillating loops. Contributions from the photocells 11 of the separate oscillators are all in the same phase regardless of orientation, and thus augment each other in the common amplifier 12' to provide a continuous orientation-independent output signal.

It should be noted that two spaced-apart magnetometers in accordance with the present invention may have their outputs combined for measuring the gradient of magnetic field between the two magnetometer locations. For example, a second self-oscillating magnetometer (elements 1 through 12) could be substituted for the crystal oscillator 14 in FIG. 1 whereby the difference frequency read-out 15 indicates the gradient between the separate magnetometers.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an optical magnetometer, the combination comprising: means forming a pair of optical absorption volumes, each containing an assemblage of quantum systems which may precess in a unidirectional magnetic field at a rate which is determined by the intensity of said field, said quantum systems being split into magnetic sublevels by said field and exhibiting a time-varying alignment among said sublevels at said precession rate, means for directing optical radiation to said absorption volumes with such spectral characteristics as to be differentially absorbed with respect to the magnetic sublevels of said quantum systems whereby the intensity of the radiation received from each volume is intensity modulated at a frequency which depends on said precession rate, means for converting the intensity modulation of the radiation received from said absorption volumes into alternating electrical signals, and means for cross-coupling the alternating electrical signals derived from each absorption volume to the other absorption volume in the form of an alternating magnetic field which produces forced precessions of said quantum systems thereby effecting self-sustained oscillation of said electrical signals at a frequency determined by the intensity of said unidirectional magnetic field.

2. The combination of claim 1, wherein said optical radiation directing means comprises a source of optical resonance radiation of said quantum systems, said radiation aligning said quantum systems by optical pumping.

3. The combination of claim 1 including means for circularly polarizing the optical radiation provided by said radiation directing means in opposite senses of circular polarization with respect to the direction of the unidirectional magnetic field.

4. The combination of claim 1 further including means responsive to said self-sustained oscillation for monitoring said unidirectional magnetic field.

5. The combination of claim 1 further including means for monitoring the magnitude of the phase shift between the alternating electrical signals of said absorption volumes.

6. The combination of claim 1 further including means for monitoring the polarity of the phase shift between the alternating electrical signals of said absorption volumes.

7. The combination of claim 1 further including means for separately recording the alternating electrical signals of said absorption volumes.

8. In an optical magnetometer adapted to be oriented in a substantially unidirectional magnetic field, the combination comprising: absorption cell means containing an assemblage of quantum systems which may precess in a unidirectional magnetic field, means for directing optical radiation to separate parts of said absorption cell means with such spectral characteristics as to be differentially absorbed with respect to the magnetic sublevels of said quantum systems, means for oppositely polarizing separate portions of the optical radiation directed through the separate parts of said absorption cell means whereby respective portions of said assemblage of quantum systems occupying said separate parts of said absorption cell means have mutually inverse distributions of sublevel absorption, means coupled to said absorption cell means for producing an alternating magnetic field at the precession frequency of said assemblage of quantum systems, and means responsive to the intensity of the optical radiation which is received from the parts of said absorption cell means for providing a composite alternating signal, which composite signal varies in accordance with the alternating magnetic field frequency at which resonance precessions of said quantum systems are produced, whereby independence of said composite signal on the orientation of said magnetometer in said magnetic field is enhanced, and said frequency is determined by the intensity of said unidirectional magnetic field; and means for measuring said frequency as an indication of the intensity of said unidirectional magnetic field coupled to said responsive means.

9. The combination of claim 8 wherein said quantum systems are alkali atoms in the ground state.

10. The combination of claim 8 wherein said quantum systems are helium atoms maintained in a metastable state.

11. The combination of claim 8 including means for circularly polarizing said optical radiation portions in opposite senses of circular polarization with respect to the direction of said unidirectional magnetic field.

12. The combination of claim 11 including a generator for supplying said alternating magnetic field, means for modulating the effective frequency of said generator, and means responsive to said modulation for maintaining the frequency of said generator at the frequency which produces resonance precessions of said quantum systems.

13. The combination of claim 8 including means for coupling one separate part of said absorption cell means to another part of said cell means, such coupling means being a common amplifier.

14. The combination of claim 13 wherein said composite signal is obtained from the output of said common amplifier.

15. The combination of claim 14 wherein said quantum systems are alkali atoms in vapor form, said optical radiation comprising circularly polarized spectral radiation of said alkali atoms propagated with an opposite sense of circular polarization relative to said unidirectional magnetic field through each separate part of the absorption cell means, the propagation directions of optical radiation in the separate parts being disposed at acute angles relative to each other.

16. The combination of claim 15 wherein said acute angles are approximately 45°.

17. An optical magnetometer comprising: means forming a pair of optical absorption volumes containing assemblages of alkali atoms in vapor form which may precess in a unidirectional magnetic field of unknown intensity, means for directing optical beams of the spectral radiation of said alkali atoms to each of said absorption volumes with opposite senses of circular polarization relative to the unidirectional magnetic field, means for modulating the intensity of said beams at the precession frequency of said atoms, means for converting the intensity modulation of each beam into an alternating electrical signal at said precession frequency, means for cross-coupling the electrical signal derived from each absorption volume to a coil encircling the opposite absorption volume coaxially about the direction of the light beam passing therethrough, said coils creating alternating magnetic fields which produce forced precession of said atoms thereby effecting self-sustained oscillation at a frequency which is substantially proportional to the intensity of said unidirectional magnetic field, and output means responsive to said oscillation frequency.

18. An optical magnetometer according to claim 17 wherein said alkali atoms are mixed with a buffer gas for preventing disorienting wall collisions of said atoms.

19. An optical magnetometer according to claim 18 further including means for filtering a portion of said spectral radiation beams to thereby enhance optical pumping.

20. An optical magnetometer according to claim 19 wherein said absorption volumes contain rubidium vapor.

21. An optical magnetometer according to claim 20 wherein said intensity converting means comprises a mosaic of silicon solar cells.

22. In an optical magnetometer apparatus, the combination comprising: a plurality of optical magnetometers, each comprising a pair of absorption volumes containing an assemblage of quantum systems which may precess in a unidirectional magnetic field, means for passing optical radiation through each absorption volume with such spectral characteristics as to be differentially absorbed with respect to the magnetic sublevels of said quantum systems whereby the intensity of the radiation passing through each volume is intensity modulated at a frequency which depends on the precession rate of said quantum systems, means for converting the intensity modulation of the radiation passing through each absorption volume into an alternating electrical signal, and means for cross-coupling the electrical signal associated with the radiation passing through each absorption volume to the opposite absorption volume of the same magnetometer in the form of an alternating magnetic field which produces forced precessions of said quantum systems thereby effecting self-sustained oscillation at a frequency determined by the intensity of said unidirectional magnetic fields, said oscillation experiencing at least one dead zone as a function of the propagation direction of said optical radiation relative to the direction of said unidirectional magnetic field; the propagation direction of optical radiation in the separate magnetometers being disposed at angles relative to each other at which the dead zones of said magnetometers are in anti-coincidence whereby the oscillations of said separate magnetometers may be combined to provide a signal of enhanced orientation independence.

23. The combination of claim 22 further including means responsive to said combined signal for monitoring said unidirectional magnetic field.

24. In an optical magnetometer apparatus, the combination comprising: a plurality of optical magnetometers, each comprising absorption cell means containing an assemblage of quantum systems which may precess in a unidirectional magnetic field, means for passing optical radiation through separate portions of said absorption cell means with such spectral characteristics as to be differentially absorbed with respect to the magnetic sublevels of said quantum systems, the optical radiation portions passed through the separate portions of said absorption cell means having mutually distribution of sublevel absorption, means coupled to said absorption cell means for producing an alternating magnetic field at the precession frequency of said quantum systems, and means responsive to the intensity of the optical radiation which has passed through both portions of said absorption cell means for providing a composite signal which varies in accordance with the alternating magnetic field frequency at which resonance precessions of said quantum systems are produced, said frequency being determined by the intensity of said unidirectional magnetic field and said composite signal experiencing at least one dead zone as a function of the propagation direction of said optical radiation relative to the direction of said unidirectional magnetic field; the propagation directions of optical radiation in the separate magnetometers being disposed at angles relative to each other at which the dead zones of said magnetometers are in anti-coincidence whereby the signals of said separate magnetometers may be combined to provide a magnetic intensity indication of enhanced orientation independence.

25. An optical magnetometer comprising: at least first and second optical absorption volumes, each containing an assemblage of quantum systems which may precess in a unidirectional field at a rate which is determined by the intensity of said field, said quantum systems being split into magnetic sublevels by said field and exhibiting a time-varying alignment among such sublevels at the precession rate; means for directing optical radiation to said absorption volumes with such spectral characteristics as to be differentially absorbed with respect to the magnetic sublevels of said quantum systems, whereby the intensity of the radiation received from each volume is intensity modulated at the Larmor frequency; means for converting the intensity modulation of the radiation received from at least first and second absorption volumes into first and second signals respectively; means for coupling the first electrical signal to said second volume; means for coupling the second electrical signal to said first volume, so that forced precessions of said quantum systems are produced thereby effecting self-sustained oscillation at a frequency determined by the intensity of the unidirectional magnetic field.

26. An optical magnetometer comprising: first and second absorption cells respectively containing similar quantum systems disposed along a common axis; a source of radiation disposed along said axis and between said cells for providing radiation with such spectral characteristics as to be differentially absorbed with respect to the magnetic sublevels of said quantum systems; a first radio frequency coil coupled to said first cell; a second radio frequency coil coupled to said second cell; first means for detecting the intensity of non-absorbed radiation passing through said first cell, and for converting said detected radiation to a first alternating curent signal; second means for detecting the intensity of non-absorbed radiation passing through said second cell, and for converting said detected radiation from said second cell to a second alternating current signal; first means coupling the first detecting and converting means to said second radio frequency coil; second means coupling the second detecting and converting means to said first radio frequency coil, so that self-sustained oscillation is realized.

27. An optical magnetometer as in claim 26 wherein means are provided for circularly polarizing said radiation from said source.

28. In an optical magnetometer adapted to be oriented in a substantially unidirectional magnetic field, the combination comprising: absorption cell means containing an assemblage of quantum systems which may precess in a unidirectional magnetic field; means for directing optical radiation to separate parts of said absorption cell means with such spectral characteristics as to be differentially absorbed with respect to the magnetic sublevels of said quantum systems; means for oppositely polarizing separate portions of the optical radiation directed through the separate parts of said absorption cell means whereby respective portions of said assemblage of quantum systems occupying said separate parts of said absorption cell means have mutually inverse distributions of sublevel absorption; means coupled to said absorption cell means for producing an alternating magnetic field at the precession frequency of said assemblage of quantum systems; means responsive to the intensity of the optical radiation which is received from the parts of said absorption cell means for providing a composite signal, which composite signal varies in accordance with the alternating magnetic field frequency at which resonance precessions of said quantum systems are produced, whereby independence of said composite signal on the orientation of said magnetometer in said magnetic field is enhanced, and said frequency is determined by the intensity of said unidirectional magnetic field; and means coupling said optical radiation responsive means to said alternating magnetic field means for establishing a condition of self-sustained oscillation at a frequency determined by the intensity of the optical radiation which is received by said absorption cell means.

29. An optical magnetometer comprising: first and second absorption cells, each containing an assemblage of quantum systems; means including a light source disposed between said cells for directing radiation to said absorption cells such radiation being intensity modulated at the Larmor frequency of said quantum systems which precess in a unidirectional magnetic field at a rate that is determined by the intensity of such field; first and second detectors for detecting the intensity modulation of the radiation received from said first and second cells respectively, and for converting such intensity modulation to first and second alternating electrical signals; and first and second radio frequency coils coupled respectively to said first and second cells, one end of such first coil being coupled to said second detector, one end of such second coil being coupled to said first detector, the other ends of such coils being coupled to a source of reference potential.

References Cited by the Examiner
UNITED STATES PATENTS

| 3,054,069 | 9/1962 | Kastler | 331—3 |
| 3,103,621 | 9/1963 | Fraser | 324—0.5 |

FOREIGN PATENTS

| 875,242 | 8/1961 | Great Britain. |

OTHER REFERENCES

Franzen et al.: Physical Review, vol. 108, No. 6, Dec. 15, 1957, pp. 1453–1458.

CHESTER L. JUSTUS, *Primary Examiner.*

MAYNARD R. WILBUR, *Examiner.*